(12) United States Patent
Sansalone

(10) Patent No.: US 9,049,696 B2
(45) Date of Patent: Jun. 2, 2015

(54) MULTIPLE CALL SESSION SYSTEM AND METHOD FOR A MOBILE PHONE

(75) Inventor: Giuseppe Nicodemo Sansalone, Montreal (CA)

(73) Assignee: PROJECTONE SOLUTIONS, INC., Montreal (Quebec) (CA)

( * ) Notice: Subject to any disclaimer, the term of this patent is extended or adjusted under 35 U.S.C. 154(b) by 98 days.

(21) Appl. No.: 13/881,472

(22) PCT Filed: Oct. 24, 2011

(86) PCT No.: PCT/CA2011/001183
§ 371 (c)(1),
(2), (4) Date: Jul. 22, 2013

(87) PCT Pub. No.: WO2012/055017
PCT Pub. Date: May 3, 2012

(65) Prior Publication Data
US 2013/0303133 A1    Nov. 14, 2013

Related U.S. Application Data

(60) Provisional application No. 61/406,367, filed on Oct. 25, 2010.

(51) Int. Cl.
*H04W 76/02* (2009.01)
*H04M 1/725* (2006.01)
*H04M 3/56* (2006.01)
*H04M 3/428* (2006.01)
*H04W 88/18* (2009.01)

(52) U.S. Cl.
CPC ........ *H04W 76/025* (2013.01); *H04M 1/72519* (2013.01); *H04M 1/72583* (2013.01); *H04M 3/428* (2013.01); *H04M 3/56* (2013.01); *H04M 2207/20* (2013.01); *H04M 2250/66* (2013.01); *H04W 88/18* (2013.01)

(58) Field of Classification Search
USPC ...................................... 455/414.1
See application file for complete search history.

(56) References Cited

U.S. PATENT DOCUMENTS

| | | |
|---|---|---|
| 5,949,765 A | 9/1999 | Deadman et al. |
| 6,212,395 B1 | 4/2001 | Lu et al. |
| 6,564,054 B1 | 5/2003 | Imafuku et al. |
| 6,681,119 B1 | 1/2004 | Verdonk |
| 6,798,767 B1 | 9/2004 | Alexander et al. |
| 6,985,723 B2 | 1/2006 | Kil |
| 7,031,443 B2 | 4/2006 | St-Onge et al. |
| 7,116,656 B1 | 10/2006 | Gardell et al. |
| 7,308,255 B2 | 12/2007 | Loveland |

(Continued)

*Primary Examiner* — Diane Mizrahi
(74) *Attorney, Agent, or Firm* — Baker & Hostetler LLP

(57) ABSTRACT

A multiple call session system and method for a mobile phone device is disclosed. The system comprises a server and a host mobile phone. The server has a virtual switchboard for simultaneously communicating with a plurality of external voice devices over corresponding voice paths on a communications network and a controller connected to the virtual switchboard for controlling the voice paths. The server further includes a memory for storing at least one call flow, the memory being in communication with the controller of the server. The host mobile phone is in communication with the server over a mobile network for remotely accessing the voice paths, via the switchboard, and for sending a command signal to the controller, to activate one of the at least one call flow for any one of the voice paths, in order to independently control any one of the voice paths from the host mobile phone.

19 Claims, 9 Drawing Sheets

(56) References Cited

U.S. PATENT DOCUMENTS

| | | |
|---|---|---|
| 7,324,528 B2 | 1/2008 | Szlam |
| 7,424,313 B2 | 9/2008 | Ham et al. |
| 7,742,768 B2 | 6/2010 | Liu et al. |
| 7,826,868 B2 | 11/2010 | Robbins et al. |
| 7,876,888 B2 | 1/2011 | Chatterjee et al. |
| 2002/0009991 A1 | 1/2002 | Lu et al. |
| 2003/0139180 A1 | 7/2003 | McIntosh et al. |
| 2004/0156491 A1 | 8/2004 | Reding et al. |
| 2004/0258055 A1* | 12/2004 | Kurganov ............. 370/352 |
| 2005/0190747 A1 | 9/2005 | Sindhwani et al. |
| 2005/0249147 A1 | 11/2005 | Fowler |
| 2006/0023657 A1 | 2/2006 | Woodson et al. |
| 2006/0030357 A1 | 2/2006 | McConnell et al. |
| 2006/0160566 A1 | 7/2006 | Plahte et al. |
| 2007/0005729 A1 | 1/2007 | Cox et al. |
| 2007/0070976 A1 | 3/2007 | Mussman et al. |
| 2007/0206569 A1 | 9/2007 | Silver et al. |
| 2007/0263601 A1* | 11/2007 | Kurganov ............. 370/352 |
| 2008/0280639 A1 | 11/2008 | Alfia |
| 2009/0175434 A1 | 7/2009 | Becker |
| 2010/0080198 A1 | 4/2010 | Li |
| 2010/0124904 A1 | 5/2010 | Forte |
| 2010/0128723 A1* | 5/2010 | Kurganov ............. 370/352 |
| 2010/0184408 A1 | 7/2010 | Vendrow et al. |
| 2010/0246575 A1 | 9/2010 | Hakusui |
| 2010/0278320 A1* | 11/2010 | Arsenault et al. ........ 379/88.12 |
| 2012/0106400 A1* | 5/2012 | Rahman ............. 370/259 |

\* cited by examiner

MULTIPLE CALL SESSION SYSTEM AND METHOD FOR A MOBILE PHONE

REFERENCE TO RELATED APPLICATIONS

This application is a National Stage of International Application No. PCT/CA2011/001183, filed on Oct. 24, 2011, which claims the priority of U.S. Provisional Application No. 61/406,367, filed Oct. 25, 2010, the disclosures of which are incorporated by reference in their entirety.

FIELD OF THE INVENTION

The present invention relates to a multiple call session system. More particularly, the present invention relates to multiple call session system for a mobile phone as well as to a method associated thereto.

BACKGROUND OF THE INVENTION

Most organization, including offices, businesses or the like, rely on some sort of phone system or private branch exchange (PBX) for communication purposes. One of the main uses for such a system is the management of incoming calls, namely from a public phone system, to individuals or groups within the organization. Another use is the management of calls originating within the organization, and directed to individuals and/or groups. In other words, company phone systems or PBXs, in most cases, manage all the calls to and from an organization, as well as between company employees.

Most of the above-mentioned phone systems are designed such that a specific extension is routed to a fixed line somewhere in the organization. Also, most phone system features are proprietary, in they are built into or configured onto a particular user's phone set. Such a system satisfies the needs of organizations where all users work from their respective desks. However, more and more, organizations are virtual, dynamic and rely on cellular technology when employees are outside the office (i.e. users are mobile, users work remotely with respect to a main business location, users work from their homes, users alternate between an office location and remote locations, users travel, users are mobile within an office space, etc.).

For example, many businesses have employees who work at different locations and at varying time intervals (day and/or night time). Many businesses and such employees rely on cellular technology in order to keep in touch with clients, suppliers and employees back at an office location. At the office, the user has access to the full spectrum of PBX features, such as voicemail, extensions, conference calling and multi-line capabilities. This is not the case, when the user works outside the office and communicates via his/her cellular phone.

Thus, static extensions are limiting to such users and their associated organizations, in that phone system features are tied to a particular phone set on one individual user's desk. Therefore, there is a need to integrate cellular technology and PBX technology, in order for employees to work seamlessly anywhere and at anytime.

Some newer phone systems support the ability to re-route an extension to one's cellular phone or even call a business line and a cellular phone simultaneously—hoping to reach the individual no matter where he/she is. This is an improvement to typical phone systems but does not fully use available cellular and computing technology, in order to offer the full spectrum of possible features, namely multi-line features.

It is foreseeable, given the current trends in telecommunications, that multiple lines and PBX-like features will be available on cellular smart-phones using voice over Internet Protocol (VoIP), via a dedicated smart-phone application. However, the cellular data network must be able to handle much more bandwidth than is currently available. More importantly, it must do so consistently, even in times of peak traffic. Furthermore, future multi-line VoIP applications (or "apps") are likely to require installation on both the caller and receiver devices, given the current trends in smart-phone applications and VoIP.

Known to the Applicant are United States patent applications having publication Nos. US 2006/0030357 A1 (McCONNELL et al.) and US 2006/0160566 A1 (PLAHTE et al.).

US 2006/0030357 discloses an IP PBX system that serves enterprise telephones via a landline IP network connection which is expanded to serve cellular wireless communication devices (WCD). The system provides an IP PBX server. Calls to and from a cellular WCD are connected through the IP PBX system, so that the IP PBX system controls and manages the calls just as the IP PBX would control and manage calls involving other extensions on the IP PBX. The system is used for ringing another IP PBX Extension, sending a call to voicemail, terminating inside calls, ringing the cellular WCD, ringing two or more IP PBX extensions simultaneously, and the like. However, the system does not provide the cellular device with multiline capabilities.

US 2006/0160566 teaches a mobile branch exchange (MBX) allowing a user of a mobile telephone to exploit the functionality of a private branch exchange (PBX) as if the user were using a PBX-connected wire line telephone in an office setting. A server is placed on corporate premises and the server is configured to communicate with corresponding client software programmed into a programmable mobile telephone. The server directly interfaces with the PBX to control call placement and connectivity and operates as an intermediary proxy for the mobile telephone. Features concerning more than one line generally refer to conference call features.

The following documents describe similar PBX systems adapted for cellular phones: U.S. Pat. No. 6,212,395 (LU et al.), U.S. Pat. No. 6,564,054 (IMAFUKU et al.), U.S. Pat. No. 6,681,119 (VERDONK), U.S. Pat. No. 7,742,768 (LIU et al.), and U.S. Pat. No. 7,876,888 (CHATTERJEE et al.); as well as United States patent applications No. 2002/0009991 (LU et al.), No. 2005/0249147 (FOWLER), No. 2006/0023657 (WOODSON et al.), No. 2007/0206569 (SILVER et al.), No. 2010/0080198 (LI), and No. 2010/0124904 (FORTE). However, the teachings of the above-mentioned documents suffer from drawbacks, as will be apparent in view of the following explanations.

Hence, in light of the aforementioned, there is a need for an improved system which, by virtue of its design and components, would be able to overcome some of the above-discussed prior art concerns.

SUMMARY OF THE INVENTION

It is an object of the present invention is to provide a system which, by virtue of its design and components, satisfies some of the above-mentioned needs and is thus an improvement over other related systems and/or methods known in the art.

In accordance with the present invention, the above mentioned object is achieved, as will be easily understood, by a multiple call session system such as the one briefly described herein and such as the one exemplified in the accompanying drawings.

In accordance with an aspect of the invention, the multiple call session system comprises: a server having a virtual switchboard for simultaneously communicating with a plurality of external voice devices over corresponding voice paths on a communications network and a controller connected to the virtual switchboard for controlling the voice paths; a memory for storing at least one call flow, said memory being in communication with the controller of the server; a host mobile phone being in communication with the server over a mobile network for remotely accessing the voice paths, via the switchboard, and for sending a command signal to the controller, to activate one of the at least one call flow for any one of the voice paths, in order to independently control any one of the voice paths from the host mobile phone.

In accordance with another aspect of the invention, there is provided a server for a multiple call session system comprising: a memory for storing at least one call flow and a host mobile phone, the server comprising: a virtual switchboard for simultaneously communicating with a plurality of external voice devices over corresponding voice paths on a communications network; and a controller being connected to the virtual switchboard for controlling the voice paths, the controller being in communication with the host mobile phone over a mobile network for providing the host mobile phone with remote access to the voice paths and for receiving a command signal from the host mobile phone, said controller being further in communication with the memory to activate, in response to said command signal one of the at least one the call flow for at least one of the voice paths, in order to independently control said at least one of the voice paths from the host mobile phone.

In accordance with yet another aspect of the invention, there is provided a host mobile phone for a multiple call session system comprising a server and a memory, the server having a virtual switchboard for simultaneously communicating with a plurality of external voice devices over corresponding voice paths and a controller for controlling the voice paths, the memory being in communication with the controller of the server and having at least one call flow stored thereon, the host mobile phone comprising: a user interface for receiving a user command; and control means, integrated in a processor, being in communication between the user interface and the controller of the server, for remotely accessing the voice paths and for sending to the controller, a control signal corresponding to the user command, to activate one of the at least one call flow for any one of the voice paths in order to independently control any one of the voice paths from the host mobile phone.

In accordance with yet another aspect of the invention, there is provided a method for a multiple call session system having a server, a memory and a host mobile phone, the server having a virtual switchboard for simultaneously communicating with a plurality of external voice devices over corresponding voice paths and a controller for controlling the voice paths, the memory being in communication with the controller of the server and having at least one call flow stored thereon, the host mobile phone being in communication with the server over a mobile network the method comprising: (a) at the server, receiving a control signal from the host mobile phone, and (b) at the controller, activating, in response to the control signal, one of the at least one call flow for at least one of the voice paths in order to independently control said at least one of the voice paths from the host mobile phone. Preferably, the control signal from the host mobile phone contains data relative to the target voice path or paths and to the call flow(s) to be activated on this or these voice path(s).

Preferably, there is provided multi-line method for a host mobile phone in a multi-line system, the host mobile phone being in communication with a plurality of phone lines over a mobile phone network via a server, the method comprising: receiving a status message from the server, said status message being related to one of said plurality phone lines; presenting status information on a user interface of the host mobile device; receiving user input via the user interface in response to the status information; and sending a control message to the server based on the user input, said control message being related to one of said plurality of phone lines, in order to provide independent control of each of the phone lines remotely from the host mobile phone.

Preferably, the host mobile phone comprises: a phone communication means being in communication over a mobile phone network with the server, for receiving therefrom information related to said plurality of phone lines; a multi-line application for processing information received; and a user interface for presenting data to a user and for receiving user commands from said user. Preferably, the user interface includes a display screen and displays thereon a list of items corresponding respectively to the phone lines.

Preferably, there is provided multi-line method for a server being communication over a telephone network with a plurality of phone devices and over a mobile phone network with a host mobile phone, the method comprising: receiving a control message from the host mobile phone; and performing an operation on one of said plurality of phone lines based on the control message received.

Preferably the operation performed includes any of the following: making a new call (initiating a call), connecting the phone line (taking a call) with the host mobile phone, closing the phone line (ending a call), disconnecting the phone line from the host mobile phone (placing the phone line on hold), manipulating a phone line such as providing an "on-hold" option (music, survey, game, contest, etc.), capturing information on the phone line (capturing status information, listening in, recording, etc.) and/or the like.

Preferably, the method further includes: generating status information related to one of said plurality phone lines; and sending a status message to the host mobile phone based on the status information generated.

In the context of the present invention, the afore-mentioned "managing" corresponds to activating a call flow, this may include the above-mentioned "performing an operation" and/or "generating status information", for example.

In accordance with yet another aspect of the invention, there is provided a processor-readable storage medium for a server of a multiple call session system, the server being in communication with a memory having at least one call flow stored thereon and a host mobile phone, the server comprising a virtual switchboard for simultaneously communicating with a plurality of external voice devices over corresponding voice paths and a controller being connected to the virtual switchboard for controlling the voice paths, the controller being in communication with the host mobile phone for providing the host mobile phone with remote access to the voice paths, the processor-readable storage medium comprising instructions for execution by a processor to: receive a command signal from the host mobile phone; activate, in response to said command signal, one of the at least one call flow for at least one of the voice paths, in order to independently control each of the voice paths from the host mobile phone.

In accordance with yet another aspect of the invention, there is provided a processor-readable storage medium for a host mobile phone of a multiple call session system, the host mobile phone having a user interface and a processor, and being in communication with a server, the server having a virtual switchboard for simultaneously communicating with a plurality of external voice devices over corresponding voice paths and a controller for controlling the voice paths, the controller being in communication with a memory having at least one call flow stored thereon, the processor-readable storage medium comprising instructions for execution by the processor to: access the voice paths remotely, via the server; receive a user command, via the user interface; and send to the controller, a control signal corresponding to the user command, to activate one of the at least one call flow for at least one of the voice paths in order to independently control each of the voice paths from the host mobile phone.

Preferably, there is provided a multi-line system for a mobile phone system, which comprises: a server being configured to communicate over a telephone network with a plurality of external phone devices for managing corresponding plurality of phone lines; and a host mobile phone being in communication with the server over a mobile phone network for connecting to said plurality of phone lines and for controlling said managing of the phone lines at the server.

The present invention generally seeks to provide the capability of multiple lines on a cellular phone and to integrate this with a network based (server side) phone system, in order to leverage the strengths of the cellular network, i.e. possibility of using the mobile phone remotely and/or while moving, as well as, in the case of smart-phones, to supply the computing technology for providing advanced "PBX" features visually on one's cellular phone, more particularly a multi-line capability. Thus, one mobile phone may connect over a single cellular voice line (on the "host" side) to a plurality of phone devices or the like, through respective multiple lines. Preferably, each of the multiple lines has access to a wide spectrum of server-side voice/IVR (Interactive Voice Response) features and the system provides a peer-to-peer interactive framework or protocol in order to allow each call session participant to interact asynchronously and independently (IVR-to-GUI (Graphical User Interface), GUI-to-GUI), using voice recognition, DTMF, etc. The multiple lines are preferably logical lines (or virtual lines) as only one real phone line is used on the cellular side, namely the cellular voice line available with the mobile phone.

The objects, advantages and features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
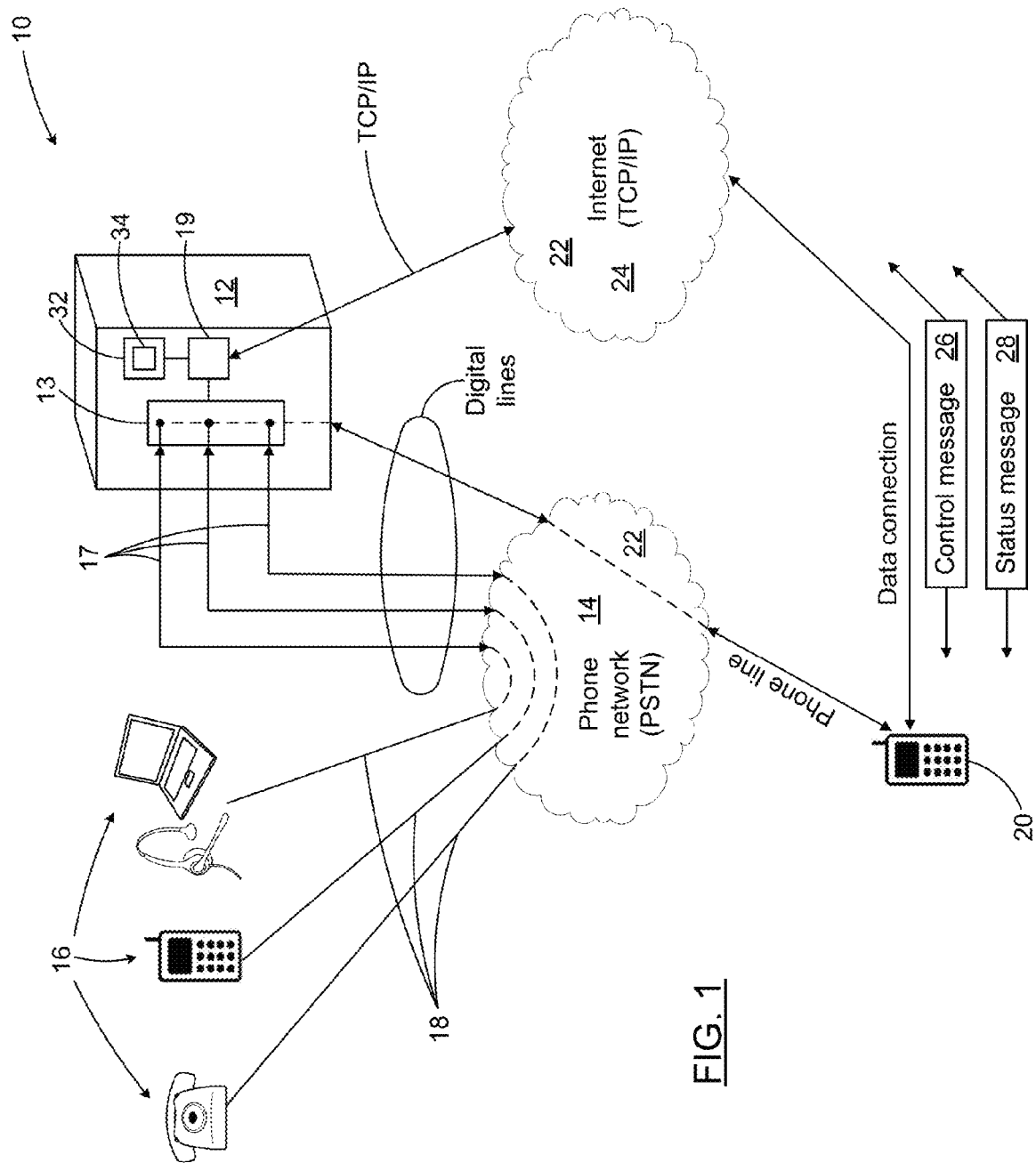
FIG. 1 is a schematic representation of a multi-line system, according to an embodiment of the present invention.

In the following description, the same numerical references refer to similar elements. The embodiments mentioned and/or geometrical configurations and dimensions shown in the figures or described in the present description are embodiments of the present invention only, given for exemplification purposes only.

In addition, not all of the particular components, configurations and steps described in the following detailed description of embodiments are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable configurations, organizations and/or architectures may be used for the multiple call session system and method according to the present invention, as will be briefly explained herein and as can be easily inferred herefrom, by a person skilled in the art, without departing from the scope of the invention. Moreover, the order of the steps provided herein should not be taken as to limit the scope of the invention, as the sequence of the steps may vary in a number of ways, without affecting the scope or working of the invention, as can also be understood.

Furthermore, in the context of the present invention, the expressions "cellular phone", "mobile phone", "mobile device", and any other equivalent expression and/or compound words thereof known in the art will be used interchangeably. Furthermore, the same applies for any other mutually equivalent expression, such as "logical line", "call session", as well as "external line", "voice path", for example as also apparent to a person skilled in the art. Furthermore, and also in the context of the present invention, the expressions "mobile network" and "cellular network" may also be used interchangeably as well as "direct communication", "voice connection", "voice communication" when referring to a connection between the host mobile phone and one of the external devices such that they can talk to each other. Furthermore, the expression "caller" or "external caller" refers to the user of an external voice device. Furthermore, the term "host user" refers to the user of the host mobile device. Furthermore, it will be understood, still in the context of the present invention, that the expressions "command signal", "control message" and "control signal" are to be used interchangeably as well.

Broadly described, the present invention devises a method and system to support multi-line capability (i.e. multiple call sessions), via cellular phones or similar mobile devices, within the current cellular voice technology. In addition, a cellular data network, or Wi-Fi™ where available, is preferably used in the most minimal way, namely for controlling features on the server-side phone system. In other words, the cellular data network is only used for a signalling mechanism, in order to support a wide spectrum of features via the server-side phone system. The cellular data network is preferably not used for the voice data. Indeed, an advantage over possible systems using VoIP is that in areas and/or times of low data bandwidth, embodiments of the present invention may still be used effectively to support multi-line capability and/or PBX features on a cellular phone, as no or little cellular data streams are used for the transmission of voice information or signals across the multiple lines. It is to be understood however that according to some embodiments, the voice data or a portion thereof, may be transmitted over the data network.

A multiple call session system in accordance with embodiments of the present invention as exemplified in the accompanying drawings will now be described.

As better illustrated in FIG. 1, there is provided, according to an embodiment of the present invention, a multiple call session system 10 (also referred to herein as "multi-line system") for a mobile phone. The multiple call session system 10 comprises a server 12 being in communication over a telephone network 14 with a plurality of external phone devices 16 for managing corresponding plurality of phone lines 17. The system 10 also comprises a host mobile phone 20 being in communication with the server 12 over a mobile phone network 22 for connecting to the plurality of phone lines 17.

Preferably, still with reference to FIG. 1, the multiple call session system 10 comprises a server 12 having a virtual switchboard 13 for simultaneously communicating with a plurality of external voice devices 16 over corresponding voice paths 17 on a communications network 14 and a controller 19 connected to the virtual switchboard 13 for controlling the voice paths 17. The system 10 further comprises a memory 32 for storing at least one call flow 34, the memory 32 being in communication with the controller 19 of the server 12. The system 10 further comprises a host mobile phone 20 being in communication with the server 12 over a mobile network 22 for remotely accessing the voice paths 17, via the switchboard 13, and for sending a command signal 26 to the controller 19, to activate one of the at least one call flow 34 for at least one of the voice paths 17, in order to independently control each of the voice paths 17 from the host mobile phone 20. Each voice path 17, is represented at the host mobile phone 20 by a corresponding call session 18, as better illustrated at FIG. 2. Thus each call session 18 represents a voice path 17, between an external voice device 16 and the server 12.

In the context of the present description, the term "call flow" refers to a set of data and instructions for engaging an exchange between the server and one of the external phone devices over a corresponding phone line thereinbetween. The memory may store one or more call flow. It is to be understood that a call flow may be part of a larger flow such that "activating a call flow" means referencing to a particular step of the larger flow. Moreover, a call flow may pre-stored or generated dynamically. Furthermore, the execution of a call flow may vary depending on input parameters (for example an answer received from an external device in response to a question sent out by the server, user information from the external device, a selection option from an external device, a specific command option input from the host mobile device, a voice recording from the external device). Call flows may be activated, for example, to send a caller to a voice mail, to output music to an external phone device, to start a question answer exchange with the external device as part of a survey, to redirect a caller to another device or target, to initiate a conference call, to provide the caller with on-hold options (listen to music, leave a message, etc.). Other examples of call flows are listed and exemplified further below.

In the context of the present description, the term "accessing a voice path" and/or any compound expression related thereto, refers to communicating with the voice path (either over a voice connection or via a data connection). Also in the context of the present description, a voice path to which a host mobile phone has "access" to, is "assigned to" the host mobile phone and represented by a "call session" at the host mobile phone. The host mobile phone may have access to view a call session (i.e. status information), to control it (i.e. manipulate the voice path), and/or the like.

Thus, according to an example where the server is simultaneously connected to three external devices, the user of the host mobile phone may send a command to the server, so as to start a call flow for a first external device to answer a phone survey, via an IVR system. While this first external device is "kept busy" by interacting with the survey call flow, the user may send a command to the server from the host mobile phone, to start another call flow for a second external device, in order to record a voice message. Furthermore, while the first and second external devices, i.e. first and second voice paths, are engaged in their respective call flows, a command may be sent to start the phone survey call flow for a third external voice device. The voice message call flow may include a step of, once the message is recorded, providing options to the end user, and of returning information to the host mobile phone to the effect that a message was recorded by the second external device. Thus, the host mobile phone independently controls each of the call sessions (i.e. the voice paths), remotely via the server, as will be better understood in light of the explanations further below.

The server may be provided by a general purpose computer, or the like, having a processor. It is to be understood that the server may be provided by a plurality of such general purpose computers being in communication with each other so as to cooperate for providing the services. Typically, the server includes software in the form of data and instructions stored in a memory and executable by the processor.

The software may be located centrally or distributed, and adapted to provide necessary services to the host mobile phone, as will be better described hereinbelow. The virtual switchboard is integrated in the processor of the server and provided by a circuit and/or packet data. The controller is also integrated in the processor of the server. The memory may be any suitable storage device provided in the server or external thereto.

The term "memory" refers to any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or the like. A plurality of such storage devices may be provided, as can be understood by a person skilled in the art. It is to be understood that the memory may be located remotely with respect to the controller of the server.

Still in the context of the present invention, the term "processor" refers to an electronic circuitry that can execute computer instructions, such as a central processing unit (CPU), a microprocessor, a controller, and/or the like. A plurality of such processors may be provided, according to embodiments of the present invention, as can be understood by a person skilled in the art. The processor may be provided within one or more general purpose computer, for example, and/or any other suitable computing device.

Preferably, the server comprises: external communication means being in communication over a telephone network, for communicating with a plurality of phone devices, each phone device being associated to a corresponding phone line; a phone line management means for managing said phone lines; and host-side communication means for communicating with the host mobile phone over a mobile phone network. The term "phone line management means" is meant to include any necessary hardware and/or software for providing the "managing", as described herein, including the necessary user interface therefore. The term "host-side communication means" is meant to include any necessary hardware and/or software for allowing an exchange of information and data with the host mobile phone, at least over the mobile phone network.

Preferably, the above-mentioned server is provided with a data communication means being in communication with the host mobile phone over a data network (cellular data network, Wi-Fi™ and/or the like) for receiving command signals therefrom and/or transmitting status information thereto.

The term "external phone devices" is meant to include any phone device being external with respect to the server, and includes conventional landline phones, mobile phones (which may be a conventional mobile phone, a smartphone, or the like), and may further include devices such as an IP (Internet protocol) phone, or even a computer (including conventional computers, tablet computers, etc.) being provided with telephony capabilities such as those provided by the Skype™ software, as well as any suitable device being adapted to provide communication over a telephone network, as described herein.

The term telephone network may include any telephone network adapted to allow communication between the above-mentioned telephone devices or the like, for example, a PSTN (public switched telephone network), a network adapted to transmit VoIP, and/or the like. The telephone network may be provided by a plurality of networks, as can be understood by a person skilled in the art, and preferably services landline phone, mobile phones, etc.

The mobile phone network is any network adapted to allowing mobile communication, for example, a cellular network, a mobile internet network or the like. The mobile phone network may include the above-mentioned telephone network, in totality or partially. Similarly, the above-mentioned telephone network may include the mobile phone network, in totality or partially.

The "host mobile phone" is a wireless phone device and may be provided by a conventional mobile phone (commands are sent via DTMF), smartphone, or the like, or even according to some embodiments of the present invention, by any suitable device, such as a computer adapted to provide telephone communication over the mobile phone network, as described herein. Moreover, the "host mobile phone" may be one of the above-mentioned "external phone devices", according to some embodiments of the present invention, as will be described hereinbelow. The "host mobile phone" is adapted to communicate with the server and to provide user interface features as will be better described further below. The host mobile phone is preferably provided with a software (or "application"), in the form of data and/or instructions stored in a memory and executable by a processor or other controller, in order to process user input and information received from the server.

Moreover, as previously described, the term "voice path" refers to a phone line between one of the external voice devices and the server. A "call session" refers to a logical line apparent at the host mobile phone, which represents a phone line between a corresponding external voice device and the server. The voice path is the voice connection between the external voice device and the server.

Preferably, with reference to FIG. 1, the host mobile phone 20 is in communication with the server 12 over a data network 24 for controlling the managing of the phone lines 18 at the server 12, by way of a control message 26 (i.e. in the form of one or more control signal) originating from the host mobile phone, which may be generated upon receiving a user command via a user interface 30 of the host mobile phone 20 (see FIG. 2) and being sent to the server 12. Preferably, the server 12 receives status information associated to one of the voice paths 17. Status information which is non-voice-path-related may be generated at the server 12. The server 12 sends at least a portion of the status information to the host mobile phone, preferably over the data network 24 of the mobile network 22. In another embodiment, said at least a portion of the status information is sent other the voice network of the mobile phone network 22. Still preferably, the status information is transmitted in the form of a status message 28. The status information may be processed for display on the user interface 30 and/or processed by the host mobile phone 20 to send a corresponding control message 26 back to the server. Moreover, the control messages 26 and/or status messages 28 are preferably provided in the form of a data packet or the like, which may be further encrypted, compressed, etc. Moreover, the control messages 26 and/or status messages 28, or a portion thereof may be transmitted over the voice network of the mobile phone network 22. Indeed, as can be understood by a skilled person, a keypad or the like, at the host device may be used for entering commands and the phone's speaker or display screen may be used for outputting status information to the user. Thus control and status messages may be exchanged without a data network, namely in the case of mobile phones which are not adapted to communicate with a data network.

Thus, as previously explained, the system, according to embodiments of the present invention, supports multi-line capability, via a cellular phone, within the current cellular voice technology, and preferably, the cellular data network, or Wi-Fi™, is used in the most minimal way, namely for controlling features on the server-side phone system.

Advantageously, in cases where the cellular data network is congested and non-responsive because of high traffic, the system according to embodiments of the present invention, still allows use of features using the existing connected cellular phone line, via IVR commands. In other words, the Dual-tone multi-frequency signalling (DTMF) capability over the existing cellular line may be used as a backup signalling mechanism in order to control server-side features. This may be accomplished by using Voice Recognition, for example, to control server-side features.

In operation, the user has access to multiple phone lines simultaneously, whether to place a call, answer multiple calls and/or conference different lines together, as well as to control or use server side features as will be better explained further below. Since the "multiple lines" are logical lines (or call sessions) and not really voice connections with the host mobile phone, different sessions may be controlled at the server and status information from the server side may be relayed to the specific session to notify the user of relevant events. Each session is preferably associated to a different caller or other application. For example, when a user is already using a line for speaking to someone and a new line is presented, via a user interface (display screen, speaker and/or the like), the user is provided with the option of answering another line.

Moreover, it is to be understood that one or more status message 28 may be generated in response to a control message 26 or, the server may be adapted to generate, in some cases, a status message 28 independently of or without any related control message. Indeed, the server 12 may be adapted to monitor a line 18 and periodically provide status information thereon. Alternatively, the server may generate status information 28 in response to an action, change of state, a user-command input, etc. having been detected on one of the plurality of phone lines 18. Moreover, generated status information may be recorded at the server or in a data storage medium, preferably connected to the server 12, and thus some of the status information generated may not be sent to the host mobile device 20.

It is to be understood also that some status information may be sent from the host mobile phone to the server, without relating to a particular control operation. Moreover, control operations may be generated at the server and sent to the host mobile phone, for example for requesting status information or the like.

Preferably, the user operates the multiple-line system from his/her mobile device, via the user interface. The user interface may be provided by, in the case of a smart phone or the like, a display screen with a key pad or a touch screen. Alternatively, for standard mobile phones, an IVR interface may be provided. The user interface may alternatively or additionally be provided with a speaker and/or microphone, using voice recognition for entering commands, etc.

A multiple call session scenario is explained hereinbelow, for exemplification, with reference to FIG. 3, with further reference to FIGS. 1 and 2. A blank vertical strip below one of external devices 16a, 16b, 16c, corresponds to the existence of a corresponding voice path and a dark portion of the strip corresponds to a period where the corresponding external device is in voice communication with the host device, as will be better understood in light of the following.

First Incoming Call

At 100, a first incoming call is initiated by calling party "A", using a corresponding communication device 16a. More particularly, calling party "A" dials the host user's direct number or company number with an extension code. The call is routed to the server, via a PSTN 14 and answered by the server 12, which initiates a voice path 17a at 102. At 104, the server 12 then looks up the IP (Internet Protocol) address (or equivalent identifier) of the host user's mobile device 20 (i.e. the host mobile phone), based on data stored in memory 32 (see FIG. 1), for example in the form of a database or other storage module, which is preferably located at the server 12 or alternatively at a remotely accessible location. Thus the server and/or database is preferably preconfigured so as to associate the IP address with one or more numbers (i.e. direct number of the mobile device, company number with extension code, direct landline number, and/or the like) within said database and/or additional accessible data sources.

Upon retrieving the corresponding IP address, the server 12, at 104, sends a status message 28, preferably over the cellular data network (TCP/IP) 24 (see FIG. 1), to the host mobile phone 20. The host mobile phone 20 receives the status message 28 and notifies the host user thereof by way of a corresponding message being output on the user interface 30 (see FIG. 2), for example, text, image, animation, etc. displayed on the display screen and/or sound, voice message, etc. output via a speaker. For example, in the case of a smart phone, a text message may be displayed on the display screen of the user, and an associated sound alert may also be emitted.

Figure 2:
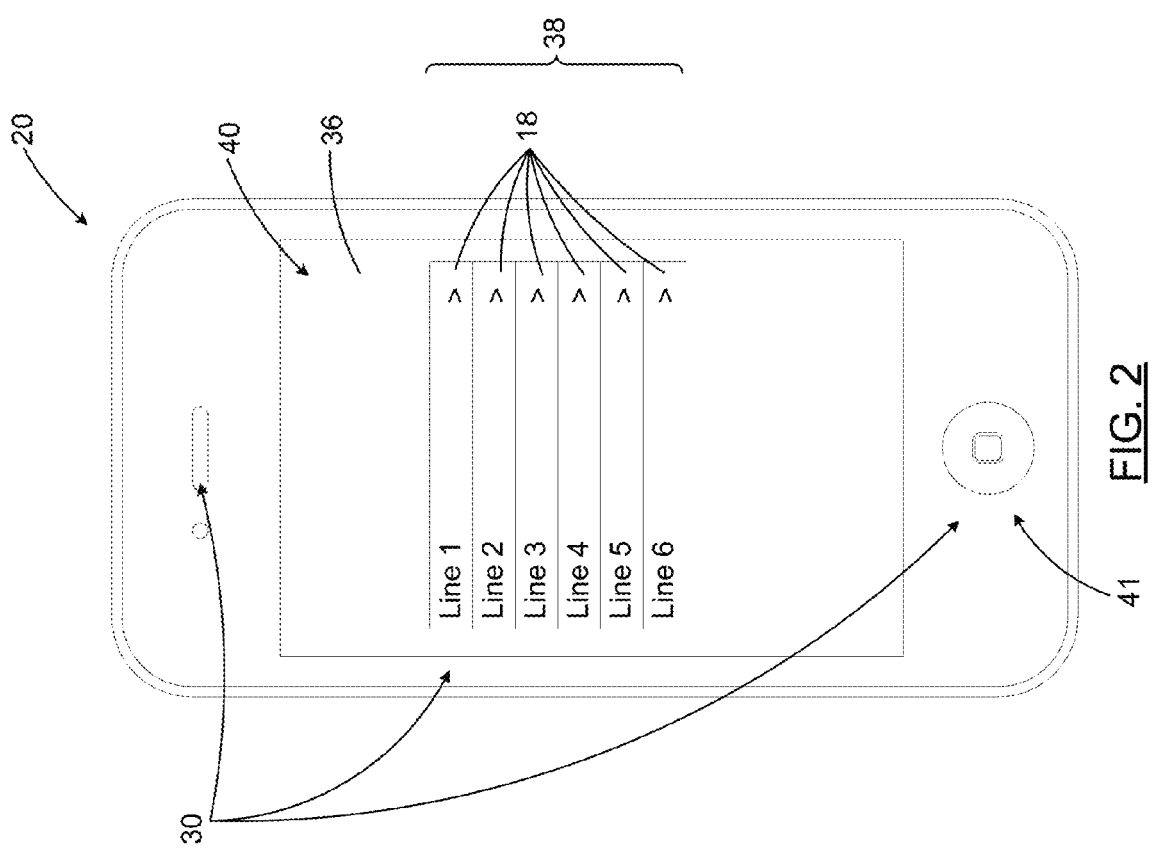
FIG. 2 is schematic representation of a host mobile phone being provided an application for operating the multi-line system, according to an embodiment of the present invention, the smart phone having a display screen displaying a corresponding graphical image.
Figure 6:
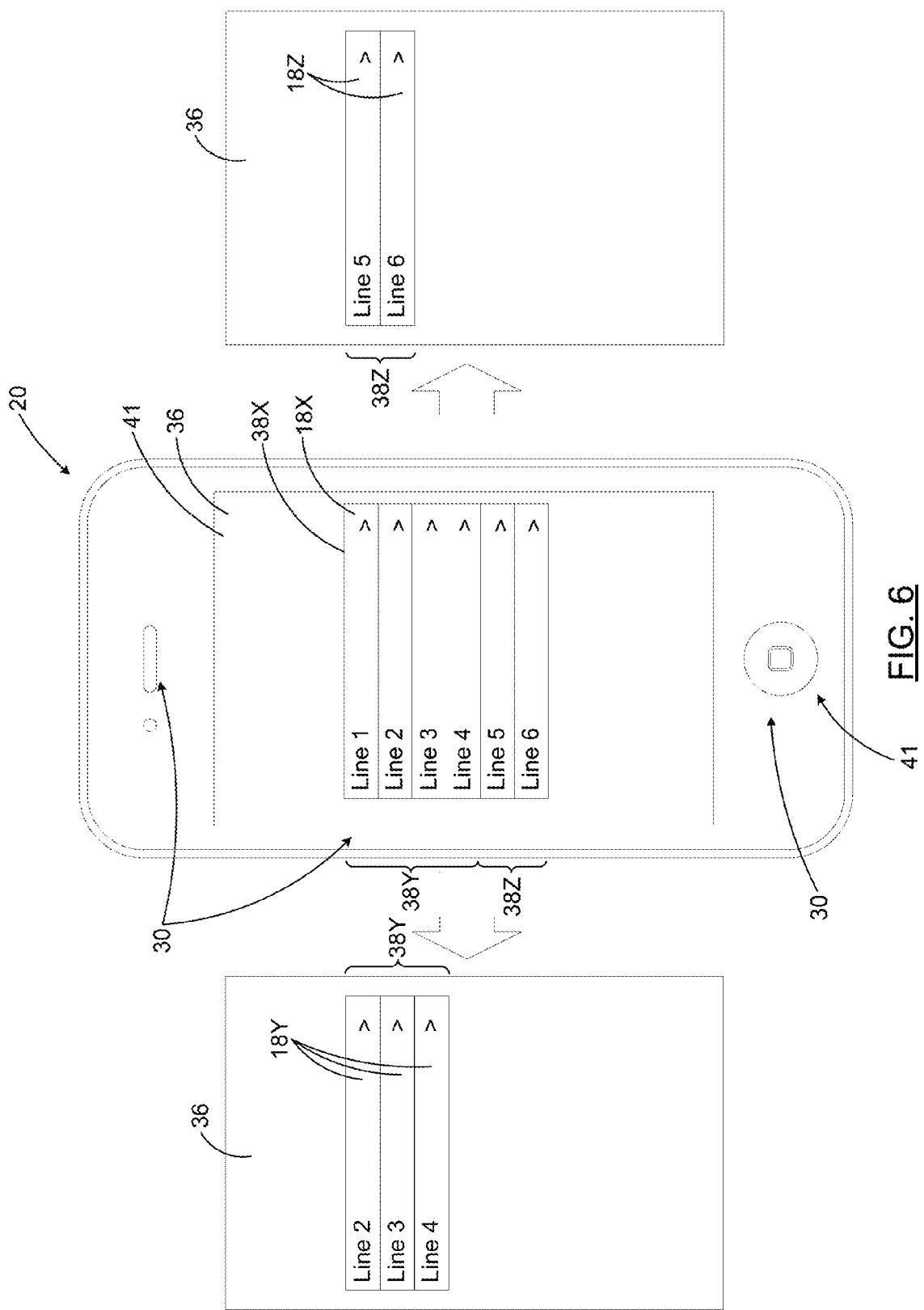
FIG. 6 is schematic representation of a smart-phone being provided with an application for operating a multi-line system having a plurality of host devices, according to an embodiment of the present invention, the smart phone being adapted to display call sessions assigned to the host mobile phone as well as call sessions assigned to said other devices, as schematically represented, by scroll the displays screen sideways.
Figure 7:
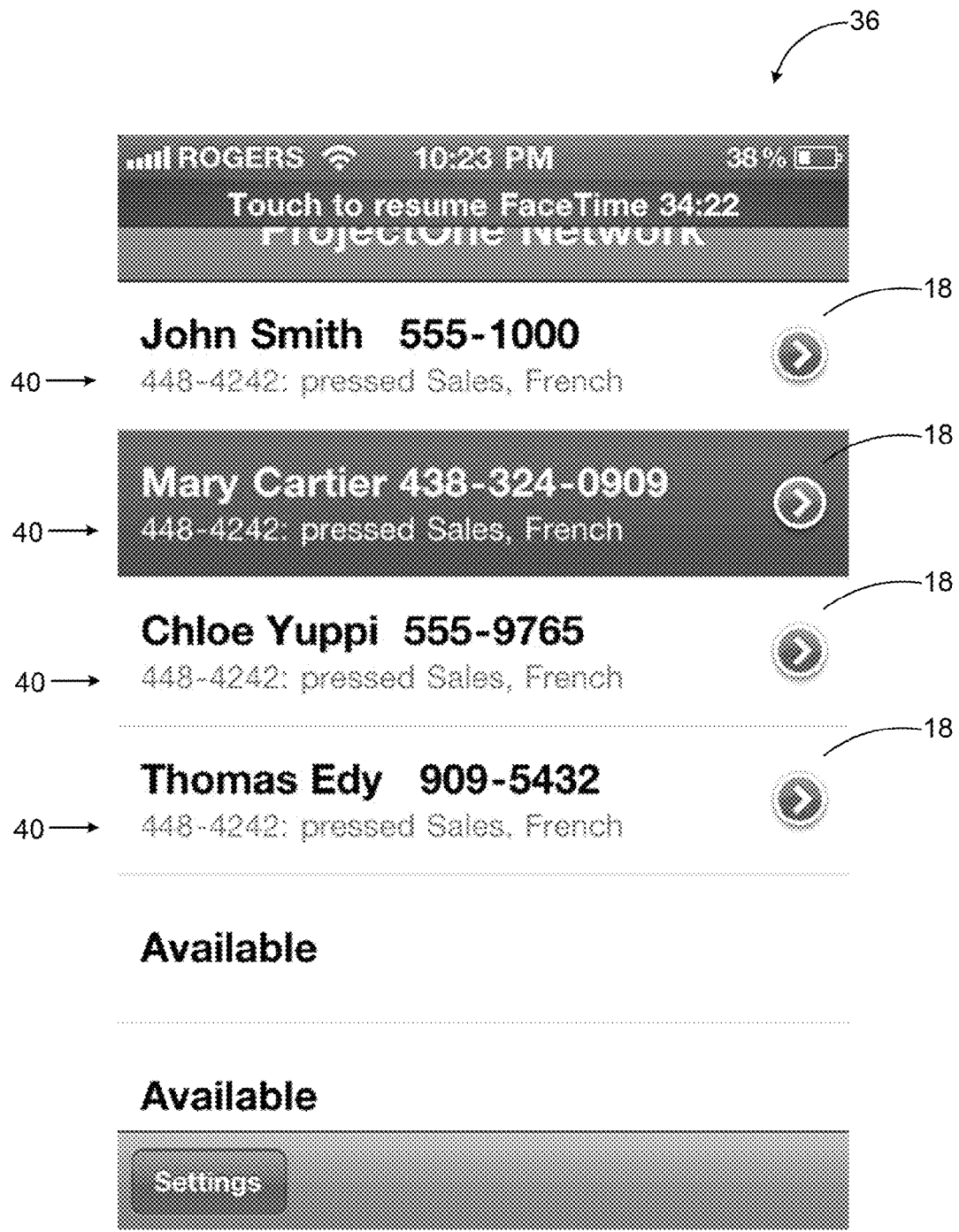
FIG. 7 is a screenshot of a display screen of a host mobile phone being provided with an application for operating a multi-line system, according to an embodiment of the present invention, the display screen showing a list of call sessions being associated with the host mobile phone.
Figure 8:
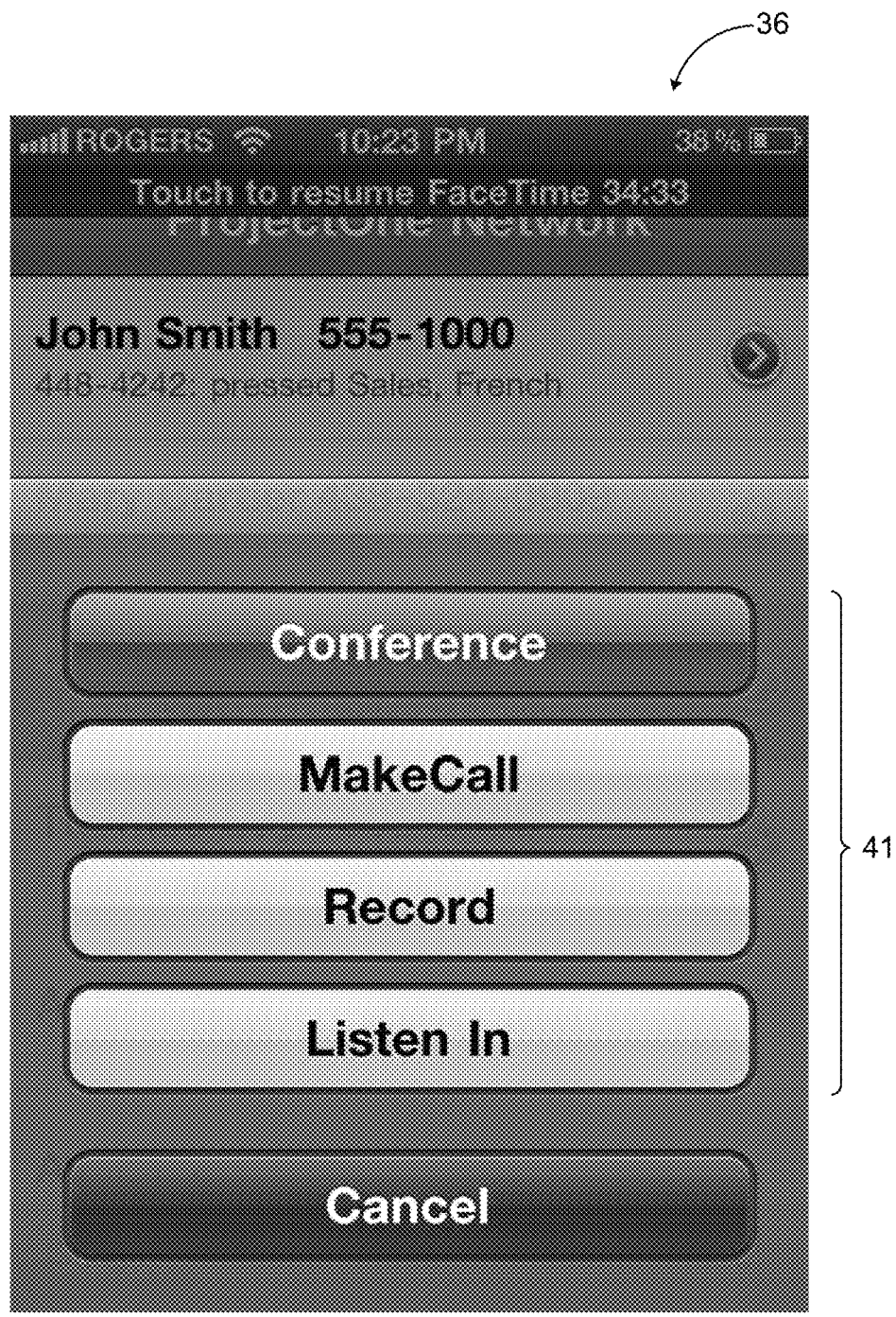
FIG. 8 is another screenshot of the display screen shown in FIG. 7, the display screen showing a set of command options for controlling one of the call sessions.
Figure 9:
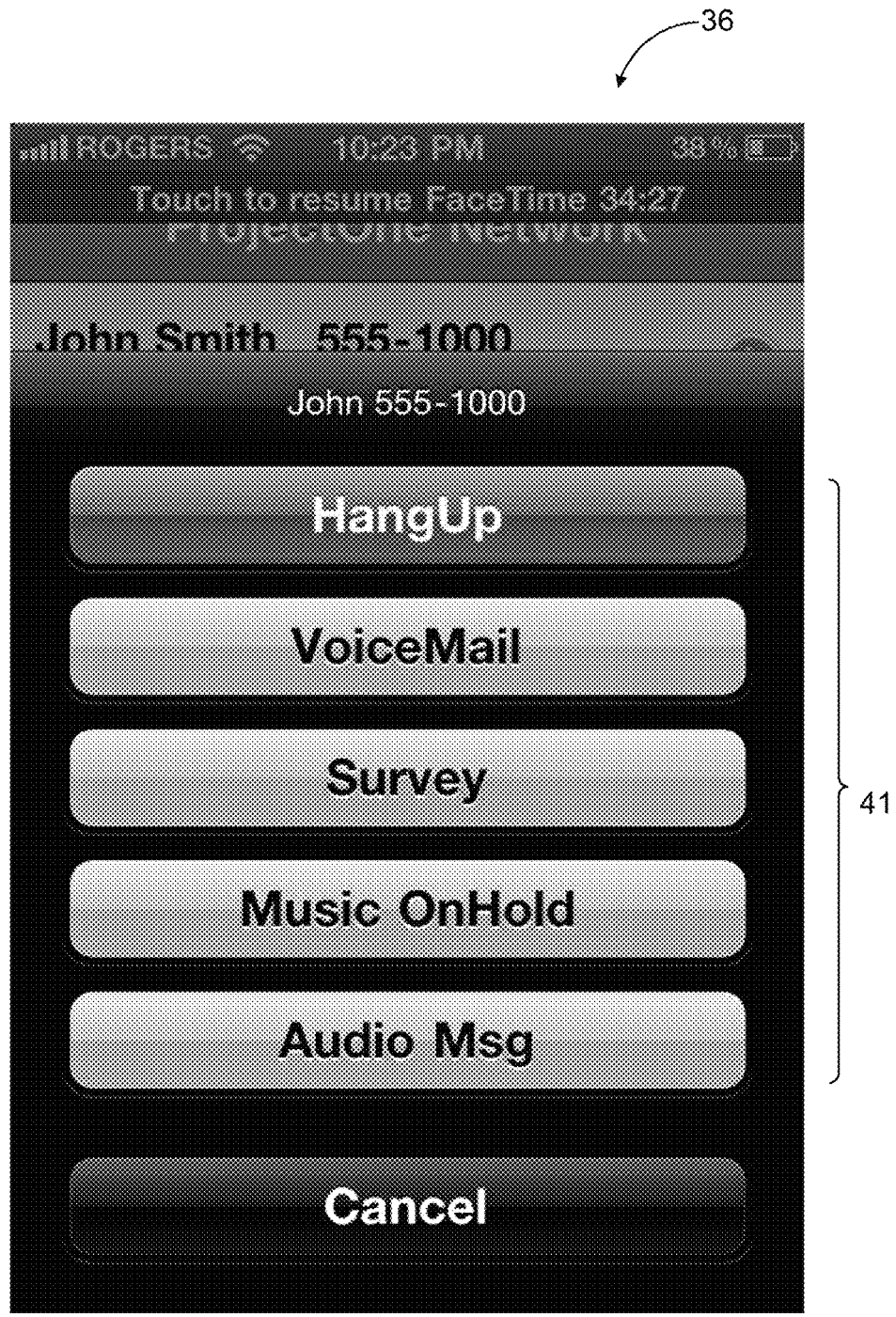
FIG. 9 is another screenshot of the display screen shown in FIG. 7, the display screen showing another set of command options for controlling one of the call sessions.

Still preferably, with reference to FIGS. 2, 6 and 7 a dedicated multi-line application stored on the host mobile phone is launched, and displays on a display screen 36 a visual representation of phone lines 17 which are under the control of (i.e. accessible to) the host mobile phone in the form of a list 38, each item of the list corresponding to a call session 18 being representative of a phone line 17 (or "voice path") between a corresponding external voice device and the server. Each item 18 of the list 38 preferably identifies the caller, as well as information related to the caller, for example the telephone number of the corresponding external device, as better illustrated in FIG. 7. Moreover, each item of the list 38 preferably also displays information being indicative of the status of the respective line (for example, connected, on hold, completing a survey, listening to music, options selected by the caller etc.), by way of a color code, icons, a text, etc. For example, as better illustrated in FIG. 7, each call session 18 is further labelled with information 40, including the number which was dialled by the external caller in order to reach the host mobile phone, as well as the list of options selected by the external caller. Preferably, upon selecting one of the items 18 of the list 38, the user is presented with various command options 41 to initiate corresponding call flows, such as answering a call, rejecting the call, sending the call to voicemail, re-routing the call to another number or communication device, etc. As better illustrated in FIGS. 8 and 9, the aforementioned command options are preferably presented to the user via the user interface, in the form of graphical interface components (for example: buttons on a touch screen, etc.). Preferably, an incoming call is displayed as an item in the list (for example, indicating "line 1"), and by selecting this item, the user may indicate his/her intention of entering into communication with the corresponding party. Preferably, the selecting is performed by pressing on the selected item on a touchscreen.

Figure 3:
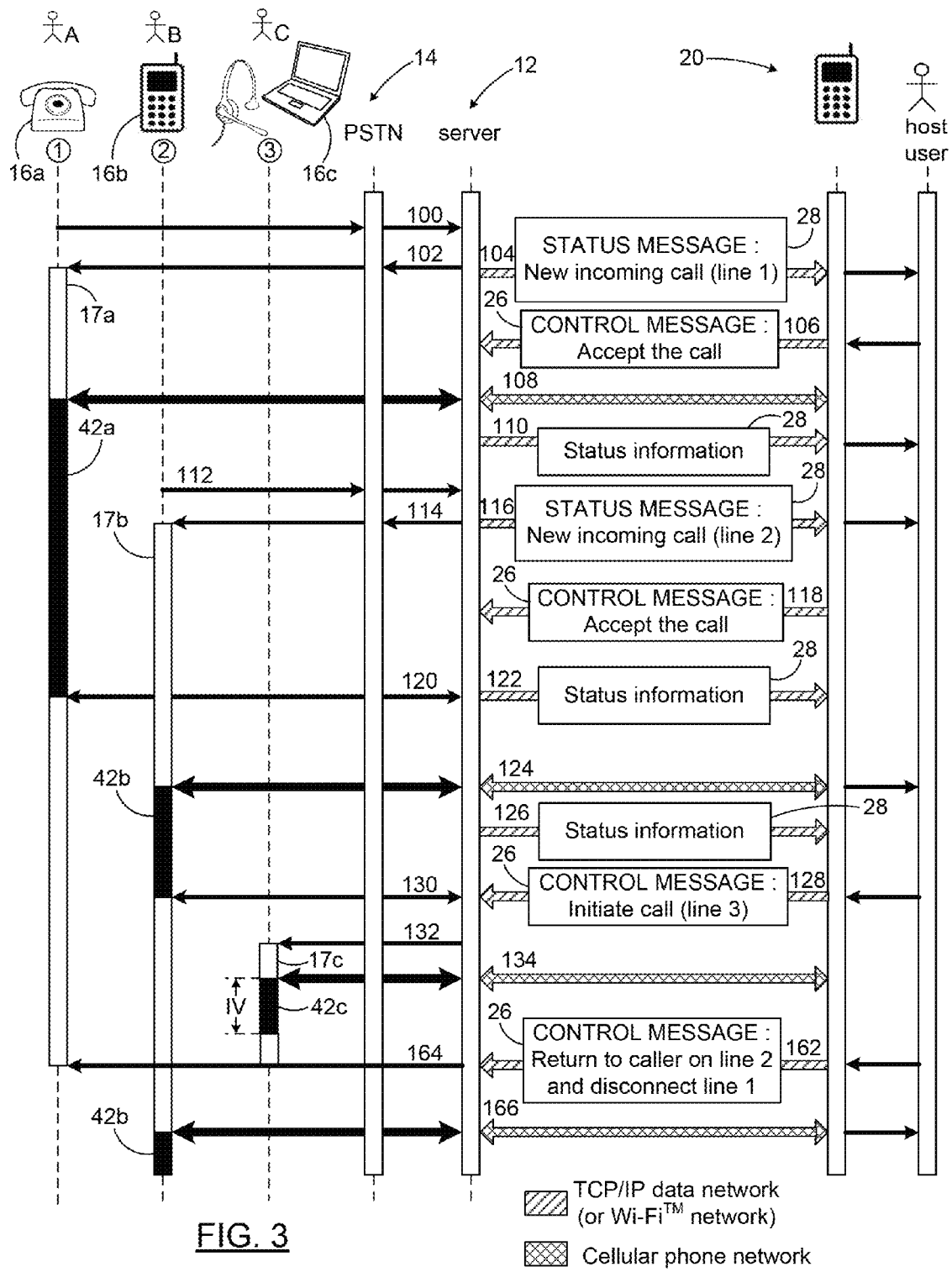
FIG. 3 is a sequence diagram representing a scenario of the multi-line system, according to an embodiment of the present invention.

Referring back to the scenario illustrated in FIG. 3, with further reference to FIG. 1, the host user selects the item identified by "line 1" (see FIG. 2) and enters a "talk" command at 106. A corresponding control message 26 is sent from the host mobile device 20 to the server 12, over the data network 24 of the cellular data network 22, to "accept" the call. The server 12 then receives the control message 26, and further to processing thereof by the controller, the switchboard connects the host mobile device at 108 with the corresponding line over the PSTN 14, in order to provide a voice connection 42a between the host mobile phone device 20 and the external voice device 16a of Party "A".

Depending on the processing time, the above steps may be performed so rapidly that the calling party, i.e. calling party "A", in the present case, is not aware of any particular delay. For example, the calling party may hear a ring tone. Alternatively, if a noticeable delay occurs (for example, longer than a predetermined threshold) between the time the server "answers" the call and the moment the host user "accepts" the call (for example, due to processing time, delay in response time by the host user, etc.), the phone line of the calling party may be processed in a number of ways, for example, holding the line, with music, advertisement and/or a recorded message, prompting the calling party to complete a survey, etc. while waiting for the host user to accept the call. By "direct communication", it is generally meant that the line is in open communication, and in the case of the above-described scenario, that the host user and calling party "A" may speak to each other directly over the cellular telephone network, preferably via the server.

At 110, status information, in the form of one or more status message(s) 28, is then send back to the host mobile phone 20, over the cellular data network, in order to confirm that line 1 is connected, for example to display the corresponding status on the user interface. Indeed, the application on the host mobile phone preferably processes this status information in order to reflect corresponding information on the user interface, preferably by displaying visual information (i.e. text, image, animation, icon, color scheme, etc.) near the item associated to "line 1".

Second Incoming Call

At 112, a second incoming call is then initiated by calling party "B", similarly to the first incoming call, using a corresponding communication device 16b. Similarly also, the call is routed to the server over the PSTN and the server 12 "answers" the call via the switchboard 13 (see FIG. 1) and initiates a corresponding voice path 17b at 114. Further to identifying the IP address (or equivalent) of the host user's mobile phone 20, by looking up data in the database for example, the server sends a status message 28 to the host mobile phone 20 at 116, indicating that a new incoming call has been received. The host mobile phone 20 receives the message 28 and the multi-line application on the host device 20 processes the message 28 and notifies the host user of the new incoming call, via device's 20 user interface 30 (see FIG. 2). Preferably, a corresponding item indicating "line 2" is added to the list on the display screen (see FIG. 2). Once again, the user is further provided with the above-mentioned command options, such as to answer, to reject, to send to voicemail, to re-route, etc. At 118, upon selecting the item in the list the host user inputs a command to put line 1 on hold with a corresponding control option (for example output music, play advertisement, send to message recording, etc) and to enter into voice communication with line 2. A corresponding control message 26 is sent back to the server 12 over the cellular data network (TCP/IP). The server 12 receives the control message 26 and further to processing thereof by the controller 19, the switchboard 13 disconnects the voice connection 42a with calling party "A" so as to place party "A" on hold (example, outputting music, advertisement, recorded messages, etc.) at 120 and corresponding status information 28 is sent back to the host mobile phone 20, for display on the user interface. At 124, the controller 19 commands the switchboard 13 to connect the host mobile phone 20 with the communication device 16b of calling party "B", so as to put the host user in direct voice communication 42b with calling party "B".

Alternatively, one or more other default operation (i.e. call flow) may be initiated automatically upon selecting the new line with party "B", or a user-initiated operation may be triggered. In any case, the user may be further provided with a number of control options, allowing him/her to perform one or more corresponding operation(s) on the first line (i.e. with party "A"). The host mobile device and/or server may thus be configured in a number of ways, according to the particular desires of the user(s) as can be easily understood by a person skilled in the art. For example, the system may be provided with default operations to be performed in some circumstances, user options to be presented at the host side (i.e. at the host mobile device) or at the external side (i.e. at the external phone device), etc. Moreover, such operations, options, and/ or the like, may be based on factors such as the particular caller and information stored in memory on this caller (her/her preferences, type of relationship with the host user, etc.), the time of day, the date, current promotions to be advertised, etc.

At 126, status information 28, in the form of one or more status message(s), is then send back to the host mobile phone 20, over the cellular data network, in order to confirm that "line 1" is on hold and that "line 2" is connected. The application on the host mobile phone 20 preferably processes this status information in order to reflect corresponding information on the user interface 30. For example, a text indicating "on hold" may appear with the listed item indicating "line 1", while the listed item indicating "line 2" may have a message indicating "connected". Alternatively, the items 18 of the list 38 may have different background colours in order to indicate which call session is in voice communication with the host mobile device 20, as better illustrated in FIG. 7, where the second item ("Mary Cartier") is displayed with a dark background to show that the host user is in voice communication with this external caller, while other items 18 on the list 38 ("John Smith", "Chloe Yuppi", "Thomas Edy"), appear with a lighter background to indicate that the host mobile phone has access to the corresponding voice path (i.e. the call sessions are under the control of the host mobile phone), without presently being in a voice communication therewith.

Thus, at step 126, in the scenario illustrated in FIG. 3, the item corresponding to "line 2" would appear on the host mobile device's 20 display screen 36 in a color scheme being representative of a voice-connected line (or voice call session), while the item corresponding to "line 1" may be displayed in a different color scheme, for example, using a faded color tone or the like, being representative of non-voice-connected lines (or non voice sessions). Additional information may be displayed when referring to "line 1", namely if the user is listening to music, completing a survey, the type of music the user has selected, any other information on user selection or action, and/or the like. Any of the above indications may be provided additionally or alternatively with an image, an icon, an animation, etc., as can be understood by a person skilled in the art.

In the present scenario of FIG. 3, the host user may now talk to calling party "B" over a voice connection 42b, while still being able to control "line 1", by sending corresponding command signals in relation thereto. The host user may further alternate between lines 1 and 2 (corresponding to calling party "A" and calling party "B" respectfully), by selecting the corresponding line on the user interface 30 (see FIG. 2).

If the host user wishes to control party A's call session, the host user may select the item in the list indicating "line 1" in order to view a list of options on the display screen, which allow the host user to control the call session. The options may include for example, "play music", "start survey", "play advertisement X", "send the caller to another communication device". Upon selecting a desired option, a corresponding control message is generated by the application of the host mobile phone and transmitted to the server over the cellular data network. In response to the control message, the controller of the server activates a corresponding work flow stored in memory, for the voice path associated to the "line 1" call session.

Outgoing Call (while 2 Other Calls are Still Active)

Still with reference to the present scenario shown in FIG. 3 as well as with reference to FIGS. 1 and 2, the host user may now decide to place an outgoing call to a new party "C". If the host user wishes to keep party B's call session active, the host user may select the item in the list indicating "line 2" in order to view a list of options on the display screen, which allow the host user to control the call session with party "B", similarly to what was described above. The host user may further choose to control party A's call session similarly, as can be easily understood by a person skilled in the art. Then, at 128, the user enters a command via the user interface 30, preferably pressing a button on the touch screen for adding a new call or a new line. By entering this command, a control message 26 is sent to the server 12 indicating that the host user intends to place a new call. Thus, at 130, the controller 19 at the server 12 processes this information and places line 2 on hold via the switchboard 13.

Alternatively, the user may be automatically presented with options for controlling lines 1 and 2 separately or together, prior to entering into communication with line 3. Such options may be presented automatically or upon request by the user, as can be understood by a person skilled in the art, based on the configuration at the mobile phone and/or server.

According to an alternative embodiment, the server automatically starts a call flow in order to engage with the external devices 16a and 16b. According to an embodiment, with various options are presented to the external device, when the corresponding line is placed "on hold". Such "on-hold" options are preferably presented to the calling party by way of a voice message, or alternatively, by other means such as a visual (interactive screen), provided that a compatible application is stored on the calling party's device. The aforementioned options may include listening to music, completing a survey, entering a contest, providing feed-back, leaving a message or call back information, entering a new extension, providing additional information on reasons of the call, etc. Alternatively, the server automatically initiates a predetermined call flow (for example, outputting advertising information, etc.). A number of features may be provided by the server as will be described further below. Preferably, corresponding status information is sent back to the host mobile device for informing the host user of the activity on lines 1 and 2 (for example, the end-user of line one is currently answering a survey and the end-user of line 2 is currently leaving a voice message).

Referring back to the scenario illustrated in FIG. 3 with further reference to FIGS. 1 and 2, the host user now enters the phone number or a selection from a contact list, corresponding to a target external device 16c. This information is then sent to the server 12, in the control message 26, which further contain data being indicative of an intension to place a new call. The control message 26 is received and processed by the server 12, which then places the call at 132, to the corresponding number by using an available phone line connected to the PSTN. Upon an affirmative response from the external device 16c, a corresponding voice path 17c is created and at 134, the server 12 connects the host mobile phone 20 with the communication device 16c of calling party "C", so as to put the host user in direct communication 42c with calling party "C".

This step may be completed before, after or substantially simultaneously with the prior step of placing lines 1 and 2 on hold. Indeed, the application on the host mobile phone may be configured such that the lines 1 or 2 may remain active, while the host user dials the new number and such that lines 1 and 2 are placed on hold only upon confirmation by the host user intends to place the new call. Alternatively, line 2 may remain in voice communication with the host mobile phone while the server verifies if the recipient (party "C") of the outgoing call is available to take the call. For example, if party "C" does not answer the call, the host mobile device receives status information to that effect and stays in direct communication (i.e. voice connection) with the party "B", and if party "C" answers the call, a status information is sent to the host mobile device, thus allowing the host user to end his/her conversation (i.e. voice connection) with the prior calling party. In the interim the server may send a recorded message to party "C" announcing that the host user will be on-line shortly.

Referring back to the scenario shown in FIG. 3, as well as with reference to FIGS. 1 and 2, the host user is now connected over the voice connection 42c with party "C" over a new line 3. Moreover, provided calling parties "A" and "B" remain on-line (on hold), the host user may now alternate between the 3 lines (i.e. voices paths 17a, 17b, 17c), as may be easily understood in view of the above explanations. As also apparent in view of the above, any status information sent from the server preferably appears on the corresponding item 18 of the list 38 (for example: a party hung up, a party chose to leave a voicemail, a party has finished answering a survey, etc.).

Figure 4:
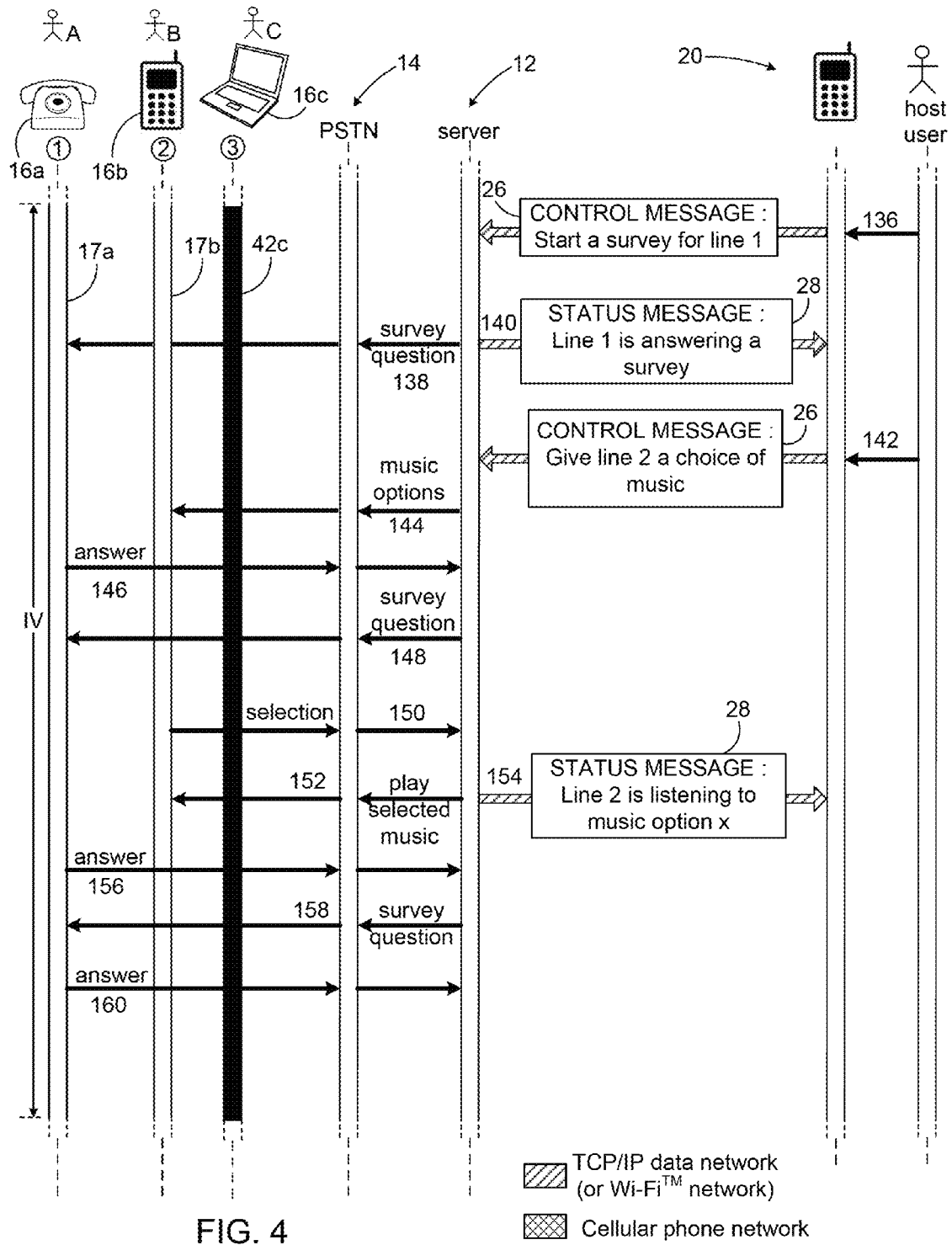
FIG. 4 is a more detailed sequence diagram of a portion of the sequence diagram shown in FIG. 3.

As exemplified in FIG. 4, the host user may send additional information in the control message in order to further control the processing of lines 1 and 2, while the host user device is in voice communication 42c with line 3. Indeed, FIG. 4 illustrates a more detailed sequence diagram of the portion identified by "IV" in FIG. 3. A blank vertical strip 17a and 17b below each of external devices 16a and 16b, represents a period of time wherein a corresponding call session 18 exits and a dark portion 42c of the strip corresponds to a period where the corresponding device is in voice communication with the host device 20. As can be seen at 136, while the host mobile device is in voice communication 42c with external device 16c, the host user enters command information in order to generate a control message 26 for initiating a call flow for line 1, which invites calling party "A" to complete a survey. Upon starting the call flow at 138, a status message 28 is returned at 140, to inform the host device 20 that line 1 is presently completing the survey. According to an embodiment, each question and/or answer may be provided to the host device in real-time via status messages. At 142, the host user further commands a control message 26 to be sent in order to initiate a call flow for line 2 at 144, which plays music for calling party "B". During this time, the server 12 processes input information received from the calling parties "A" and "B" entered via their respective external communication devices 16a and 16b, while also facilitating a voice connection between the host device 20 and external device 16c. Namely, the server 12 receives answers from line 1 (at 146, 156, 160) in response to the survey questions and further sends new questions to be answered (at 148, 158). Moreover, at 144, the server 12 provides line 2 with a choice of music, receives a user selection at 150, and responds at 152, by outputting music corresponding to the user selection entered by calling party "B".

Referring back to FIG. 3, at 162, the host device 20 further sends a control message 26 to return to "line 2" (i.e. to terminate the voice connection with line 3), that is to say, to engage a voice connection 42b with the voice path 17b of line 2, as depicted at 166. The control message 26 also commands the server 12 to disengage the communication with "line 1". Thus at 164, the server terminate the call session with external devices 16a and 16c.

Thus, according to an embodiment of the present invention, there is provided a method for a multiple call session system, as exemplified in FIGS. 3 and 4. At 100, upon receiving an incoming call request from one of the external voice devices 16a, a corresponding one of the voice paths 17a is initiated at 102 by the server, between the corresponding external voice device 16a and the virtual switchboard 13 (see FIG. 1) of the server 12. The controller 19 of the server 12 processes the incoming the call request and, at 104, the server 12 forwards the request to the host mobile phone 20. The host mobile phone 20 may be associated to a plurality of phone numbers in the memory 32 (see FIG. 1) of the server 12, such that the forwarding step 104 includes routing the call request to the host mobile phone 20 when the call request is addressed to one of said plurality of phone numbers. Upon receiving an acceptance control signal 26 from the host mobile phone 20 at 106, the server 12 links, at 108, the host mobile phone 20 with said corresponding one of the voice paths 17a, by way of the virtual switchboard 19, in order to open a voice connection 42a between the host mobile phone 20 and the corresponding external voice device 16a.

Alternatively, the call request is transferred to another destination phone device or a busy signal is returned. Still alternatively, the server assigns the voice path to the host mobile phone, without creating a voice connection, to allow the host mobile device to access and control this voice path via the server. Thus, the voice path may be remotely controlled by the host mobile phone, for example via a data network, while the host mobile device is in voice communication with another external voice over another voice path.

As better shown in FIG. 4 with reference to FIG. 1, in order to control the voice path 17a, the host mobile phone 20 generates a control signal 26, for example in response to a user's input command 136 and/or processing at the host mobile phone. The control signal 26 preferably contains information identifying the concerned voice path(s) and information on a call flow to be activated for the identified voice path(s). The host mobile phone 20 sends this control signal 26 to the server 12. At 138, upon receiving the control signal 26 from the host mobile phone 20, the server 12 activates, via the controller 19, one of the at least one call flow 34 retrieved from the memory 32, for at least one of the voice paths 17a, in response to the control signal 26, in order to independently control each of the voice paths from the host mobile phone 20.

In order to close a voice connection, referring back to FIG. 3, at step 118, the host mobile phone 20 sends a disconnection command signal 26, again based on a user's input command (and/or automated processing at the host mobile phone, for example, if the user enters a command to switch to another line. At 120, upon receiving the disconnection command signal 26 from the host mobile phone 20, the controller 19 of the server 12 commands the switchboard 13 to disconnect the voice connection 42a between the host mobile phone 20 and the corresponding voice path 17a, in order to end the voice connection 42a. At this point, the call session still remains active on the host mobile phone 20, i.e. still allowing the host mobile phone to access and control this voice path 17a via the server 12, to view the corresponding call session 18 on the display screen, to reconnect with it later on via a voice connection, etc.

In order to disconnect a voice path, referring now to FIG. 3, at step 162, the host mobile phone 20 sends a command signal 26 to disconnect the server 12 from the external device 16a, in order to close the corresponding voice path 17a and thus end a corresponding call session. The ending of a call session may be initiated automatically by an instruction in a call flow. Alternatively, it may be initiated by a user via the host mobile phone or by a user of an external phone device. Alternatively, it may be called by a processing of information at the host mobile phone and/or server, etc.

According to alternative embodiments of the present invention, the host mobile device may enter into communication with the server in order to access one or more lines for controlling or using server side features, as previously mentioned. Such server side features include: accessing voicemail on the server, sending or listening to an audio message, accessing IVR administrative functions. In another example, a logical line or session may be used for non call-related control and/or status operations, such as "turning off extension", number of voicemails waiting, etc.

According to another example, the server 12 is used as a virtual PBX, in order to allow a host mobile device to connect to an internal call center or to a particular phone of an internal network of phones. For example, the host user dials an "extension number", and based on a mapping stored in the memory 32 at the server 12, the call is directed to a plurality of phone or voice devices, which form the "call center". It is to be understood that the devices forming the call center may include mobile phone devices. Similarly, an external phone device may be directed in the same way to such a "call center" or particular phone of an internal network of phones. More particularly, the external call dials a telephone number corresponding to the "call center", the call is received at the server and based on a mapping stored in the memory 32 at the server 12, the call is directed to the plurality of phone devices forming the "call center". It is to be understood that the lines connecting the devices forming the "call center" may be located locally or remotely with respect to the server because the server has access to the public network, i.e. the server has access to call anywhere or being called from anywhere.

Figure 5:
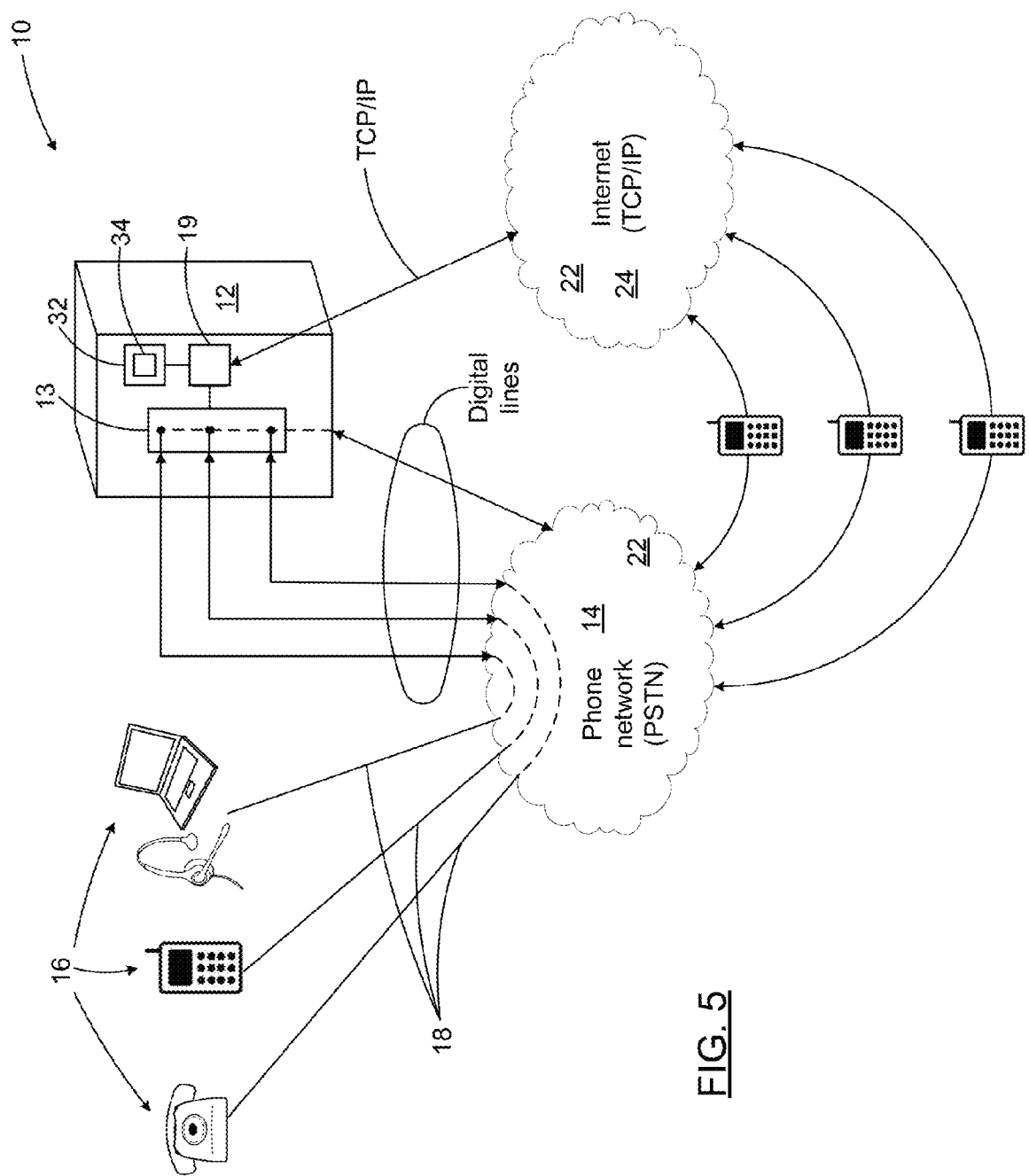
FIG. 5 is a schematic representation of the multi-line system, according to yet another embodiment of the present invention.

Referring now to FIGS. 5 and 6, according to an embodiment of the present invention, the multiple call session system 10 further comprises additional host devices 21, each being in communication with the server 12 for accessing said voice paths 17. The host mobile phone 20 is preferably configured to cooperate with the additional host devices 21 for the controlling of the voice paths 17. Preferably, the user interface 30 of the host mobile phone 20 includes a display screen 36 to display a graphic representation 38 of the call sessions 18 (i.e. corresponding to voice paths 17 which are associated with the host mobile phone), as illustrated in FIG. 6. Preferably, the display screen 36 further displays the corresponding status of each phone line (for example, "listening to music", "answering a survey", etc.). Preferably, the user interface 30 further includes controlling means 41 (for example, by way of keys, buttons, a touchscreen, microphone and voice recognition module, etc.) allowing a user to view and/or control lines 18Y and 18Z assigned to other mobile devices 21. Preferably, the additional host devices 21 are mobile phones, each having similar features to those of the host mobile phone 20.

For example, in the context of a company, there may be provided a team of users each having a host mobile phone device. Each mobile phone device displays a list of call sessions being assigned to the corresponding mobile phone device. Preferably, each mobile phone device may also displays each of the lists of call sessions which are assigned to the devices of other team members. For example, by using a sideways scrolling command, the display screen displays the list of another device. This allows a user to view the phone activities of another team member. More particularly, the user of one of the host devices may wish to identify another member of the team having fewer call sessions assigned, in order to transfer a call session or dispatch active phone lines to the device of this other member. Alternatively, the user may monitor the activities of the other members, for example, by viewing the status of each active line of a given host device. Such a feature may also be useful in the context of a worker interacting with a supplier, in order to view the status of the supplier's phone activities, or even between members of a family. It is to be understood, that in such a configuration, the server may store authority information and process call sessions accordingly, in order to control the lines or information which is accessible to other users. For example, in the context of a team of work colleagues, it may be suitable to only display call session concerning business and to avoid to displaying call sessions or information on call sessions relating to personal matters. For example, the determination of whether a call session corresponds to the "personal" category or the "business" category, may be made on the basis of the dial-in number (i.e. whether a home/mobile number was dialled-in or the office number), or based on a list of contact persons stored at the server and identified by the host user as "personal" or "business. The above-described multiple-host system, in the context of the present invention, may be adapted in a number of ways, as can be readily understood by a person skilled in the art.

It is contemplated that each host device displays a main window for displaying by default, the list of lines attributed to the particular host device, as exemplified in FIG. 2 and that each item further displays status information related to the corresponding line. Moreover, other similar windows are provided for displaying the items attributed to other user's. On a touchscreen, the other windows may appear (i.e. slide-in), in response to a sliding motion detected on the touchscreen. Moreover, a call may be transferred by performing conventional operations such as a drag-and-drop operation, using a select/copy-and-paste operation and/or the like. Alternatively, a same window and/or the same list of items may be shared and controlled collectively by a plurality of cooperating host devices, so as to share phone lines, as can also be understood by a person skilled in the art.

In the example being represented in FIG. 6, a main host mobile device 20 has access to line 1 (18X) which is assigned to the host mobile phone. The host mobile phone 20 further has access to lines 18Y, 18Z, assigned to other host devices 21 (see FIG. 5). Indeed, by scrolling the display screen 36 sideways, the host user can view the lists 38Y, 38Z of call sessions 18Y, 18Z which correspond substantially to the list displayed on the respective host devices 21. According to an alternative embodiment, the host mobile phone 20 display on a single screen, all the lines assigned to this particular host device as well as to other host device 21. It is to be understood that any one of the other host devices 21 may act as an external device 16. Moreover, in a system having a group of several phone devices, it is be understood that any one or each of the devices may cooperate so as to commonly manage a same set of call sessions 18.

According to embodiments of the present invention, the system provides a grouping mechanism to allow interactive peer-to-peer features, including (but not limited to):

many phone numbers associated to the same user or mobile phone (for example: home number and business number);

many calls made to the same user or mobile phone (i.e. Multi Line);

one phone number for many users or mobile phones (either ringing at once or executing a business logic to choose next user);

one call to many users or host mobile phones (ex: simultaneous ringing);

one user may control many call sessions;

one user may control many sessions as a group (ex: conference or broadcast message); and many users may control the same one session.

Furthermore, it is to be understood that at any step of operation of the system described herein, suitable validation and/or authentication may be applied, depending on the application and needs of the users, as can be understood by a person skilled in the art.

Embodiments of the present invention, are particularly advantageous to users in an enterprise, in that they each have access to conventional office phone capabilities and this, remotely, by using their mobile phone devices. Users are thereby enabled to work freely and conveniently from different locations, thus allowing users to communicate more dynamically, in comparison to conventional systems.

Furthermore, according to an embodiment of the present invention, multiple numbers (or Direct Inward Dialling—DIDs) may be used to access a same host mobile phone. Thus, host users may not need to reveal their cellular number to clients, suppliers, colleagues and/or the like. Indeed, workers often use the same mobile phone device for business purposes as well as for personal purposes, and it may not be desirable to receive business related calls on the mobile phone outside of business hours. Thus, users may be reached on their mobile phone devices at predetermined times, via their extension or with a DID number. This is further advantageous to callers (i.e clients, suppliers, etc.) as they are not required to remember or dial different phone numbers (office, home, mobile, etc.) in order to reach the recipient (i.e. the business worker).

As an added advantage, the present multi-line cellular system may be used to allow a single cell phone to receive both home/personal calls, as well as business related calls, each on different respective sessions, while further providing the user with proper indications as to which session is a for business and which caller dialled in a home number for example. According to an embodiment, a home number is first ported as a DID to the service provider, in order to benefit from all the features etc. Thus, there is no need for the host user to carry multiple cellular phones.

Embodiments of the present invention are thus advantageous in that they reduce and in some cases eliminate the need for proprietary phone sets. Moreover, the present invention preferably uses existing cellular, phone and Internet technology in order to create multi-line capabilities on existing cell phones.

Embodiments of the present invention offer a wide range of useful features. For example, a user may have the ability to receive calls that are also being simultaneously received by other employees (i.e. key system functionality) and have the ability to receive calls specifically directed at him or her, at the same time. In other words, the logical multiple lines may serve many purposes. They may even allow for providing status information only—duplication of other logical lines in the company. Thus, a manager may monitor different employees' lines to verify activity. Options such as "recording" or "listening to" may be provided, in regards to other employee's calls.

Moreover, with smart-phones, location information may be used and relayed back to the server-side in order to be stored for various uses. For example, a user may set his availability, in terms of receiving calls, based on his/her current location. Maybe if he/she is out of town, an incoming call would be automatically directed to a message that indicates he/she is out of town and then prompted to leave a voicemail. Another example could be when he/she is driving, the smart-phone application communicating with the server may signal that location data is changing quickly indicating driving. In that case, a caller would be sent to voicemail and/or hear a specific greeting (optionally indicating User is driving). This, of course, is all dependent on how the user would like to configure his/her phone settings. Moreover, location information may be stored at the server or any other storage device for future consultation, for monitoring, for providing location information on a user in real-time, etc, as can be understood by a person skilled in the art.

Moreover, custom information may be delivered (additionally or alternatively to the conventional CallerID and Name display), from the server, to the user depending on a user selection, a user preference, a preset configuration (according to a set of rules) and/or the like. Any information on the server-side phone system may be delivered back to the smartphone or host phone. Examples include the number which was dialled by a caller or a corresponding identifier (for example, "home", "work", "mobile") the language selected by the caller, the department selected by the caller, duration that caller is on IVR phone system before being directed to the user, etc.

For example, with reference to FIG. 7, each listed call session element 18, indicates at 40 the number having been dialled-in by the corresponding caller. In the illustrated embodiment, all the dial-in numbers are the same, however, it is to be understood that different numbers may appear for a same host mobile phone, for example in a system where the server maps several telephone numbers to be directed to the same host mobile phone, according to a previously described embodiment.

In addition, the host user preferably has the ability to control the external party's line. Example of such control features include: sending the calling party to voicemail, playing a particular music or music program when the line is held ("on-hold"), prompt calling party to answer survey questions, etc. These control features are preferably commanded by the user via the user interface, using corresponding control components, such as a radio button or any other suitable graphical user interface component, or even a microphone for receiving voice commands (in combination with a voice recognition module). Upon receiving such a command input, the host mobile device preferably processes the command input and sends a resulting control message to the server which in turn processes the control message and further performs an operation, in accordance with the control message.

Furthermore, status information is preferably sent back from the server to the host mobile phone as to what the external party is doing and/or as to the status of the line. Preferably, the mobile phone then presents the status information via the user interface, preferably visually on a display screen. Example of status messages include: "listening to music", "music X was selected", "leaving a voicemail", "answering question 2 of survey Y", "answered question Z with a yes", "requesting to speak", "pressed 5 to notify user that he/she will call back", etc. Alternatively or additionally, a predefined image, icon, symbol, animation, sound, music, movement (for example a vibration of the phone) and/or the like being representative of particular status information may also be presented to the user.

According to embodiments of the present invention, the host user may initiate group phone features such as teleconferencing, preferably by selecting each line (or "item" in the list) and then clicking or selecting an appropriate button or command object for starting the conferencing. A corresponding control message is then sent to the server indicating that all selected lines must be put into a conference call. The actual conference call is located and managed at the server (i.e. all lines are connected digitally at the server). In fact, most features are on the server side—the User simply sends Control messages to the server to initiate features.

Embodiments of the present invention are also advantageous in that all users are connected to the server via a data network, preferably TCP/IP, and may thus exploit the features of this data network, such as sending text messages to each other or to a group of callers, etc. These features are preferably integrated with the multi-line application of the host mobile phone in order to allow users to communicate with other users while remaining on the phone line, for example with clients. Such a feature may be particularly useful, for example, when a quick answer to a question is desired from other members of the company in order to serve clients on the phone.

A non-exhaustive list of examples of call flows (i.e. server-side features), which may be activated for each logical line (i.e. "external" line) on a multi-line cellular device, include:
  send caller to voicemail;
  send caller to on-hold music;
  send caller to IVR question/answer (ex: survey);
  send caller to confirm agreement via recorded agreement and prompt to accept;
  send caller to specific message in User's voicemail;
  send caller to another extension or number;
  send caller to another call center (i.e. group of logical lines or host phone devices);
  send caller to a phone chat session (conference);
  send multiple callers (or lines) to a call conference;
  send an audio message to a specific number and/or extension;
  send caller to a pre-recorded audio message(s);
  send caller to specific music on hold;
  send caller to music on hold and record what he/she says;
  request to listen in on another active line in the company;
  request to record another active line in the company;
  request to record any conversation on any line;
  request "instant audio messaging session"—caller instantly hears a message saying that User (i.e. at the host mobile device) will be sending him a message and that he/she should stay on the line and wait (although he/she may hang-up if he/she wanted and still get audio message delivered to caller), then user records a message and the message is sent to caller (either on hold or delivered)—available on a new incoming call or existing answered call or while caller was leaving user a voicemail. The caller may then reply with an audio message. The user then, preferably receives a status message indicating that an audio reply is waiting. Thus the user may intermittently exchanges audio messages with the caller while he/she is controlling other lines or talking with others users (of external phones);
  send caller to on-hold music and tell him/her that the host user is on another call and will be with them shortly;
  upload music from host mobile device for output to the external device;
  send a text message, or audio message to a specific line for a specific user
  send a text message, or audio message to a specific user and/or group of users;
  request new outgoing call to a number, contact or user in company;
  request new outgoing audio message delivery to a number, group etc.;
  request conference call with a pre-determined (or selectable) group of numbers;
  request audio message conference with a group (i.e. audio message sent back and forth in the form of a message between a plurality of communication devices); and
  send multiple callers to specific place on the IVR (ex: survey questions) and get answers to questions appear as status information.

A non-exhaustive list of examples of server-side status information which may be provided for each logical line on a multi-line cellular system, include:
  new incoming call with name and caller-ID (identification), the number having been dialled-in by the caller or a corresponding identifier (for example "home", "office", "mobile"), options selected by the caller, as well as any other information available on the server (see below);

selections pressed by caller (ex: English, Sales, etc);

duration a particular caller was on an IVR phone system;

any information associated with caller's caller-ID or name that the server-side has access to via pre-populated database (for example: address, type of client, if active client or not, sales volume, VIP or priority client, etc);

all status and control duplication of another logical line from another host user—for the purpose of monitoring other lines in the company, i.e. controlling and monitoring of any user's work session (list of assigned voice paths) from any other user's device;

number of active calls per user, per call center, per department, per phone system, overall company wide, etc.;

number of callers on-hold per user, per call center, per department, per phone system, overall company wide;

number of idle users per dept, company etc;

number of calls received today, last hour, last week, last month, etc;

number of calls made today, last hour, last week, last month, etc;

number of times callers pressed a certain selection in the phone system—per user, per dept, per company etc (and also in the last hour, day, etc);

number of times a certain feature was used (example: line recording, voicemail, audio messaging) per user, per department, per company (and by hour, day, week etc);

text messages from other users in company;

information which may indicate that an audio message or voicemail message is waiting and/or how many such messages are waiting, etc.;

status text indicating caller completed survey, stayed on hold too long, pressed a certain selection, etc.;

Examples of features which may be available on a multi-line smart-phone include (but are not limited to):

Receive incoming calls that other Users in the company are also receiving, and receive calls specifically intended for a given host user—ability to tell the difference between both. In addition, can receive both (and many) at the same time. In other words, an incoming call may "ring" multiple logical lines across multiple host phones.

Location based information of smart-phone can be relayed back to the server in order to personalize and customize availability settings, re-routing to voicemail etc.

Same functionality wherever the host user goes—home, on the road and at work.

Dynamic phone system because of the extra lines and ability to easily communicate to server. In addition, configuration settings are instantly available to change and modify. New Users are easily added and more lines are instantly and/or dynamically added/changed.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. A multiple call session system for a mobile phone, comprising:

a server having a virtual switchboard for simultaneously communicating with a plurality of external voice devices over corresponding voice paths on a communications network and a controller connected to the virtual switchboard for controlling the voice paths;

a memory for storing at least one call flow, said memory being in communication with the controller of the server;

a host mobile phone being in communication with the server over a mobile network for remotely accessing the voice paths, via the switchboard, and for sending a command signal to the controller, to activate one of the at least one call flow for any one of the voice paths, in order to independently control any one of the voice paths from the host mobile phone.

2. The multiple call session system according to claim 1, further comprising one or more additional host device, each being in communication with the server for accessing said voice paths, the host mobile phone being configured to cooperate with said one or more additional host device for the controlling of the voice paths.

3. A server for a multiple call session system comprising a memory for storing at least one call flow and a host mobile phone, the server comprising:

a virtual switchboard for simultaneously communicating with a plurality of external voice devices over corresponding voice paths on a communications network; and a controller being connected to the virtual switchboard for controlling the voice paths, the controller being in communication with the host mobile phone over a mobile network for providing the host mobile phone with remote access to the voice paths and for receiving a command signal from the host mobile phone, said controller being further in communication with the memory to activate, in response to said command signal one of the at least one the call flow for at least one of the voice paths, in order to independently control said at least one of the voice paths from the host mobile phone.

4. The server according to claim 3, wherein the memory is a processor-readable storage medium comprising data and statements defining the at least one call flow.

5. A host mobile phone for a multiple call session system comprising a server and a memory, the server having a virtual switchboard for simultaneously communicating with a plurality of external voice devices over corresponding voice paths and a controller for controlling the voice paths, the memory being in communication with the controller of the server and having at least one call flow stored thereon, the host mobile phone comprising:

a user interface for receiving a user command; and control means, integrated in a processor, being in communication between the user interface and the controller of the server, for remotely accessing the voice paths and for sending to the controller, a control signal corresponding to the user command, to activate one of the at least one call flow for any one of the voice paths in order to independently control any one of the voice paths from the host mobile phone.

6. A method for a multiple call session system having a server, a memory and a host mobile phone, the server having a virtual switchboard for simultaneously communicating with a plurality of external voice devices over corresponding voice paths and a controller for controlling the voice paths, the memory being in communication with the controller of the server and having at least one call flow stored thereon, the host mobile phone being in communication with the server over a mobile network the method comprising:

a) at the server, receiving a control signal from the host mobile phone, and b) in response to the control signal, activating by using the controller, via the virtual switchboard, one of the at least one call flow for at least one of the voice paths in order to independently control said at least one of the voice paths from the host mobile phone.

7. The method according to claim 6, further comprising:
at the server, receiving status information associated to one of said voice paths.

8. The method according to claim 7, further comprising after step (a):
at the server, sending at least a portion of the status information to the host mobile phone.

9. The method according to claim 8, wherein the sending is executed over a data network of the mobile network.

10. The method according to claim 8, wherein the sending is executed over a voice network of the mobile network.

11. The method according to claim 9, wherein the host mobile phone has a user interface, the method further comprising:
displaying on the user interface, a graphical representation of the voice paths which are associated with the host mobile phone, and of the associated status information.

12. The method according to claim 9, wherein the system further comprises one or more additional host device being in communication with the server for accessing said voice paths, and wherein the host mobile phone and said one or more additional host device, each has a user interface, the method further comprising:
displaying on the user interface of each of said host mobile phone and one or more additional host device, a graphical representation of the voice paths which are assigned to the host mobile phone and to at least one of the one or more additional host devices.

13. The method according to claim 6, further comprising:
at the server, receiving status information associated to the host mobile phone and processing said status information.

14. The method according to claim 6, further comprising prior to step (a):
upon receiving an incoming call request from one of the external voice devices, initiating at the server, a corresponding one of the voice paths between the corresponding external voice device and the virtual switchboard of the server.

15. The method according to claim 14 further comprising:
forwarding the call request to the host mobile phone; and assigning the voice path to the host mobile phone to be accessible from said host mobile phone.

16. The method according to claim 15, wherein the host mobile phone is associated to a plurality of phone numbers in a memory, and wherein said forwarding comprises:
routing the call request to the host mobile phone when the call request is addressed to one of said plurality of phone numbers.

17. The method according to claim 7, further comprising, after step (b), closing at least one of said voice paths to end a corresponding call session.

18. A processor-readable storage medium for a server of a multiple call session system, the server being in communication with a memory having at least one call flow stored thereon and a host mobile phone, the server comprising a virtual switchboard for simultaneously communicating with a plurality of external voice devices over corresponding voice paths and a controller being connected to the virtual switchboard for controlling the voice paths, the controller being in communication with the host mobile phone for providing the host mobile phone with remote access to the voice paths, the processor-readable storage medium comprising instructions for execution by a processor to:
receive a command signal from the host mobile phone;
activate, in response to said command signal, one of the at least one call flow for at least one of the voice paths, in order to independently control said at least one of the voice paths from the host mobile phone.

19. A processor-readable storage medium for a host mobile phone of a multiple call session system, the host mobile phone having a user interface and a processor, and being in communication with a server, the server having a virtual switchboard for simultaneously communicating with a plurality of external voice devices over corresponding voice paths and a controller for controlling the voice paths, the controller being in communication with a memory having at least one call flow stored thereon, the processor-readable storage medium comprising instructions for execution by the processor to:
access the voice paths remotely, via the server;
receive a user command, via the user interface; and
send to the controller, a control signal corresponding to the user command, to activate one of the at least one call flow for at least one of the voice paths in order to independently control said at least one of the voice paths from the host mobile phone.

* * * * *